(12) United States Patent
Courtemanche et al.

(10) Patent No.: US 12,514,802 B2
(45) Date of Patent: Jan. 6, 2026

(54) POLYMER/HYDROPHOBIC ESTER OIL BLEND

(71) Applicants: Dow Silicones Corporation, Midland, MI (US); Dow Global Technologies LLC, Midland, MI (US); Rohm and Haas Company, Collegeville, PA (US)

(72) Inventors: Marc-Andre Courtemanche, Midland, MI (US); Wenjun Xu, Eagleville, PA (US); Isabelle Van Reeth, Incourt Walloon Brabant (BE); Helene Dihang, Taisnières-sur-Hon (FR); Tian Lan, Langhorne, PA (US); Myoungbae Lee, Midland, MI (US); Matthew Mclaughlin, Midland, MI (US)

(73) Assignees: Dow Silicones Corporation, Midland, MI (US); Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 350 days.

(21) Appl. No.: 18/022,896

(22) PCT Filed: Sep. 21, 2021

(86) PCT No.: PCT/US2021/051167
§ 371 (c)(1),
(2) Date: Feb. 23, 2023

(87) PCT Pub. No.: WO2022/066591
PCT Pub. Date: Mar. 31, 2022

(65) Prior Publication Data
US 2023/0301888 A1   Sep. 28, 2023

Related U.S. Application Data

(60) Provisional application No. 63/082,764, filed on Sep. 24, 2020.

(51) Int. Cl.
*A61K 8/37* (2006.01)
*A61K 8/73* (2006.01)
*A61Q 17/04* (2006.01)

(52) U.S. Cl.
CPC .............. *A61K 8/37* (2013.01); *A61K 8/731* (2013.01); *A61Q 17/04* (2013.01); *A61K 2800/48* (2013.01); *A61K 2800/592* (2013.01)

(58) Field of Classification Search
CPC ............ C08J 9/28; A61K 8/731; A61K 8/062; A61K 8/06; A61K 8/25
See application file for complete search history.

(56) References Cited

U.S. PATENT DOCUMENTS

| | | |
|---|---|---|
| 3,418,312 A | 12/1968 | Klebe |
| 5,929,163 A | 7/1999 | Harashima |
| 2016/0113860 A1 | 4/2016 | Kikuchi |
| 2017/0172888 A1* | 6/2017 | Tashiro et al. |

FOREIGN PATENT DOCUMENTS

| | | | |
|---|---|---|---|
| CN | 107236352 | * | 10/2017 |
| JP | H05-311076 | | 11/1993 |
| JP | H06157246 | * | 6/1994 |
| JP | H08-208989 | | 8/1996 |
| WO | WO2010058148 | * | 5/2010 |

OTHER PUBLICATIONS

Gousse et al., ("Surface silylation of cellulose microfibrils: preparation and rheological properties", Polymer Elsevier, Amsterdam, NL, vol. 45, No. 5, Mar. 1, 2004 (Mar. 1, 2004), pp. 1569-1575, (Year: 2004).*
Gousse et al. (Year: 2004).*
Gousse, "Surface silylation of cellulose microfibrils: preparation and rheological properties", Polymer, vol. 45, No. 5, 2004, pp. 5-6.
Togrul, "Flow properties of sugar beet pulp cellulose an intrinsic viscosity-molecular weight relationship", Carbohydrate Polymers, 2003, vol. 54, No. 1, pp. 63-71.

* cited by examiner

*Primary Examiner* — Robert A Wax
*Assistant Examiner* — Kimberly Barber
(74) *Attorney, Agent, or Firm* — Thomas S. Deibert

(57) ABSTRACT

A polymer/hydrophobic ester oil blend is provided comprising (a) a cosmetically acceptable hydrophobic ester oil; and (b) a thickening polymer powder, thickening polymer, wherein the thickening polymer is a silylated cellulose polymer, comprising a cellulose polymer functionalized with —Si($R^1$)$_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group; and wherein the cellulose polymer has a weight average molecular weight of 50,000 to 1,500,000 Daltons. Also provided are suncare formulations containing same and methods of using same.

13 Claims, No Drawings

POLYMER/HYDROPHOBIC ESTER OIL BLEND

The present invention relates to a polymer/hydrophobic ester oil blend for use in personal care applications. In particular, the present invention relates to a polymer/hydrophobic ester oil blend for use in personal care applications comprising (a) a cosmetically acceptable hydrophobic ester oil; and (b) a thickening polymer, wherein the thickening polymer is a silylated cellulose polymer, comprising a cellulose polymer functionalized with $-Si(R^1)_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group; and wherein the cellulose polymer has a weight average molecular weight of 50,000 to 1,500,000 Daltons.

Two current needs for the global personal care and cosmetics industry is sustainability and high performance. Thickening agents are an important part of personal care and cosmetics formulations. Highly efficient and biobased oil thickeners are in strong demand for oil based skin care, suncare, color cosmetics and hair care applications. Oil thickeners can enhance the consistency, volume and viscosity of a given personal care or cosmetic formulation, thereby providing more stability and better performance. In particular, oil thickeners can improve suspension of other ingredients in a formulation; avoid product dripping during use, leading to higher efficiency and a better user experience; and enhance aesthetics. High shear thinning efficiency is also desirable in most applications to facilitate ease of flow and spreadability of the formulation.

Sustainable film formers with long lasting performance are also widely sought after in the personal care and cosmetics formulations. The benefits of film formers is multifold. They held avoid undesirable material transfer to clothes and hands; increased the contact time of the other ingredients with skin/hair to maximize product efficacy; and allow the product to be aesthetically pleasing to apply and wear.

There remains a continuing need for biobased products that effectively combine both oil thickening and film forming properties, especially for use in sun screen oils, foundations, skin moisturizers, lipsticks/gloss, hair conditioners, etc.

The present invention provides a polymer/hydrophobic ester oil blend comprising: (a) a cosmetically acceptable hydrophobic ester oil; and (b) a thickening polymer, wherein the thickening polymer is a silylated cellulose polymer, comprising a cellulose polymer functionalized with $-Si(R^1)_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group; and wherein the cellulose polymer has a weight average molecular weight of 50,000 to 1,500,000 Daltons.

The present invention provides a polymer/hydrophobic ester oil blend comprising: (a) a cosmetically acceptable hydrophobic ester oil; and (b) a thickening polymer, wherein the thickening polymer is a silylated cellulose polymer, comprising a cellulose polymer functionalized with $-Si(R^1)_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group; and wherein the cellulose polymer has a weight average molecular weight of 50,000 to 1,500,000 Daltons; and wherein the thickening polymer is a silylated cellulose polymer of formula I

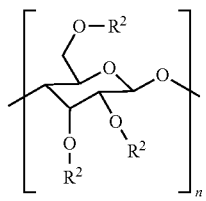

wherein n is an average of 308 to 9,252; wherein each $R^2$ is independently selected from the group consisting of a hydrogen, a $C_{1-8}$ alkyl group and a $-Si(R^1)_3$ group; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group.

The present invention provides a suncare formulation comprising: a suncare active and a polymer/hydrophobic ester oil blend comprising: (a) a cosmetically acceptable hydrophobic ester oil; and (b) a thickening powder, wherein the thickening polymer is a silylated cellulose polymer, comprising a cellulose polymer functionalized with $-Si(R^1)_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group.

The present invention provides a suncare formulation comprising: a suncare active and a polymer/hydrophobic ester oil blend comprising: (a) a cosmetically acceptable hydrophobic ester oil; and (b) a thickening polymer, wherein the thickening polymer is a silylated cellulose polymer, comprising a cellulose polymer functionalized with $-Si(R^1)_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group; and wherein the cellulose polymer has a weight average molecular weight of 50,000 to 1,500,000 Daltons; and wherein the thickening polymer is a silylated cellulose polymer of formula I

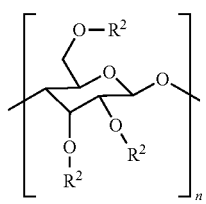

wherein n is an average of 308 to 9,252; wherein each $R^2$ is independently selected from the group consisting of a hydrogen, a $C_{1-8}$ alkyl group and a $-Si(R^1)_3$ group; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group.

The present invention provides a method of protecting skin from exposure to the sun, comprising: providing a suncare formulation of the present invention, and applying the suncare formulation to skin.

DETAILED DESCRIPTION

We have now surprisingly found the unique polymer/hydrophobic ester oil blend, as described herein, provide effective thickening (preferably, ≥50 Pa·s at 0.01 sec$^{-1}$ (more preferably, ≥100 Pa·s at 0.01 sec$^{-1}$)); effective shear thinning (preferably, ≤30 Pa·s at 100 sec$^{-1}$ (more preferably, ≤20 Pa·s at 100 sec$^{-1}$)); good water and sebum repellency; good rub off resistance and film integrity (e.g., low dye diffusion after 1 h), which properties may benefit an array of personal care compositions including sunscreen oil, foundation, lip stick, lip gloss, mascara, hair oils and antiperspirant/deodorant formulations.

Unless otherwise indicated, ratios, percentages, parts, and the like are by weight.

As used herein, unless otherwise indicated, the terms "weight average molecular weight" and "$M_w$" are used interchangeably to refer to the weight average molecular weight as measured in a conventional manner with gel permeation chromatography (GPC) and conventional standards, such as polystyrene standards. GPC techniques are discussed in detail in Modern Size Exclusion Liquid Chromatography: Practice of Gel Permeation and Gel Filtration Chromatography, Second Edition, Striegel, et al., John Wiley & Sons, 2009. Weight average molecular weights are reported herein in units of Daltons.

The term "cosmetically acceptable" as used herein and in the appended refers to ingredients typically used in personal care compositions, and is intended to underscore that materials that are toxic when present in the amounts typically found in personal care compositions are not contemplated as part of the present invention.

The term "aesthetic characteristics" as used herein and in the appended claims in reference to an acidic aqueous cleansing formulation refers to visual and tactile sensory properties (e.g., smoothness, tack, lubricity, texture, color, clarity, turbidity, uniformity).

Preferably, the polymer/hydrophobic ester oil blend of the present invention, comprises: (a) a cosmetically acceptable hydrophobic ester oil (preferably, 75 to 99.9 wt % (more preferably, 80 to 99.7 wt %; still more preferably, 85 to 99.6 wt %; most preferably, 90 to 99.5 wt %), based on weight of the polymer/hydrophobic ester oil blend, of the cosmetically acceptable hydrophobic ester oil); and (b) a thickening polymer (preferably, 0.10 to 25 wt % (more preferably, 0.3 to 20 wt %; still more preferably, 0.4 to 15 wt %; most preferably, 0.5 to 10 wt %), based on weight of the polymer/hydrophobic ester oil blend, of the thickening polymer), wherein the thickening polymer is a silylated cellulose polymer, comprising a cellulose polymer functionalized with —Si(R$^1$)$_3$ groups; wherein the cellulose polymer has a weight average molecular weight of 50,000 to 1,500,000 Daltons; wherein each R$^1$ is independently selected from the group consisting of a hydrogen, a C$_{1-8}$ alkyl group, a C$_{1-8}$ haloalkyl group, an aryl group, a C$_{1-8}$ alkylaryl group and a C$_{1-8}$ haloalkylaryl group (preferably, a hydrogen and a C$_{1-8}$ alkyl group; more preferably, a C$_{1-4}$ alkyl group; still more preferably, a C$_{1-2}$ alkyl group; most preferably, a methyl group).

Preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil. More preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil comprises aliphatic C$_{6-30}$ alkyl triglycerides. Still more preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil comprises aliphatic C$_{8-28}$ alkyl triglyceride esters. Yet still more preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil comprises aliphatic C$_{10-25}$ alkyl triglyceride esters. Most preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil includes is caprylic/capric triglyceride ester oil.

Preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of a cosmetically acceptable hydrophobic ester oil; wherein the cosmetically acceptable hydrophobic ester oil comprises aliphatic C$_{6-30}$ alkyl triglycerides; and wherein the cosmetically acceptable hydrophobic ester oil is selected from the group consisting of caproic acid, caprylic acid, capric acid, lauric acid, almond oil, andiroba oil, apricot kernel oil, argan oil, avacado oil, babassu oil, borage oil, canola oil, castor oil, coca butter, coconut oil, corn oil, cottonseed oil, crambe oil, cupuacu butter, evening primrose, grape seed oil, hazelnut oil, hybrid safflower oil, illipe butter, Japan wax, jatropha oil, jojoba oil, kokhum butter, linseed oil, mango butter, meadowfoam oil, milk fat, olive oil, ongokea oil, palm kernel oil, palm oil, peanut oil, poppyseed oil, rapeseed oil, rice bran oil, safflower oil, sesame oil, shea butter, soybean oil, sunflower oil, sweet amond oil, tallow, tung oil, walnut oil, wheat germ oil, veronia oil and mixtures thereof. More preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil comprises caprylic/capric triglyceride ester oil. Most preferably, the polymer/hydrophobic ester oil blend of the present invention, comprises 75 to 99.9 wt % (preferably, 80 to 99.7 wt %; more preferably, 85 to 99.6 wt %; most preferably, 90 to 99.5 wt %), based on weight of the polymer/hydrophobic ester oil blend, of the cosmetically acceptable hydrophobic ester oil; wherein the cosmetically acceptable hydrophobic ester oil is caprylic/capric triglyceride ester oil.

Preferably, the polymer/hydrophobic ester oil blend of the present invention, comprises 0.10 to 25 wt % (preferably, 0.3 to 20 wt %; more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer; wherein the silylated cellulose polymer comprises a cellulose polymer functionalized with —Si(R$^1$)$_3$ groups; wherein the cellulose polymer has a weight average molecular weight of 50,000 to 1,500,000 Daltons (preferably, 90,000 to 1,400,000 Daltons; more preferably, 95,000 to 1,300,000 Daltons; most preferably, 100,000 to 1,000,000 Daltons); wherein each IV is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group. More preferably, the polymer/hydrophobic ester oil blend of the present invention, comprises 0.10 to 25 wt % (preferably, 0.3 to 20 wt %; more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer; wherein the silylated cellulose polymer comprises a cellulose polymer functionalized with —Si($R^1$)$_3$ groups; wherein the cellulose polymer has a weight average molecular weight of 50,000 to 1,500,000 Daltons (preferably, 90,000 to 1,400,000 Daltons; more preferably, 95,000 to 1,300,000 Daltons; most preferably, 100,000 to 1,000,000 Daltons); wherein each IV is independently selected from the group consisting of a hydrogen and a $C_{1-8}$ alkyl group. Still more preferably, the polymer/hydrophobic ester oil blend of the present invention, comprises 0.10 to 25 wt % (preferably, 0.3 to 20 wt %; more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer; wherein the silylated cellulose polymer comprises a cellulose polymer functionalized with —Si($R^1$)$_3$ groups; wherein the cellulose polymer has a weight average molecular weight of 50,000 to 1,500,000 Daltons (preferably, 90,000 to 1,400,000 Daltons; more preferably, 95,000 to 1,300,000 Daltons; most preferably, 100,000 to 1,000,000 Daltons); wherein each IV is independently selected from the group consisting of a $C_{1-4}$ alkyl group. Yet still more preferably, the polymer/hydrophobic ester oil blend of the present invention, comprises 0.10 to 25 wt % (preferably, 0.3 to 20 wt %; more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer; wherein the silylated cellulose polymer comprises a cellulose polymer functionalized with —Si($R^1$)$_3$ groups; wherein the cellulose polymer has a weight average molecular weight of 50,000 to 1,500,000 Daltons (preferably, 90,000 to 1,400,000 Daltons; more preferably, 95,000 to 1,300,000 Daltons; most preferably, 100,000 to 1,000,000 Daltons); wherein each $R^1$ is independently selected from the group consisting of a $C_{1-2}$ alkyl group. Most preferably, the polymer/hydrophobic ester oil blend of the present invention, comprises 0.10 to 25 wt % (preferably, 0.3 to 20 wt %; more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer; wherein the silylated cellulose polymer comprises a cellulose polymer functionalized with —Si($R^1$)$_3$ groups; wherein the cellulose polymer has a weight average molecular weight of 50,000 to 1,500,000 Daltons (preferably, 90,000 to 1,400,000 Daltons; more preferably, 95,000 to 1,300,000 Daltons; most preferably, 100,000 to 1,000,000 Daltons); wherein each $R^1$ is a methyl group.

Preferably, the polymer/hydrophobic ester oil blend of the present invention, comprises 0.10 to 25 wt % (more preferably, 0.3 to 20 wt %; still more preferably, 0.4 to 15 wt %; most preferably, 0.5 to 10 wt %), based on weight of the polymer/hydrophobic ester oil blend, of a thickening polymer, wherein the thickening polymer is a silylated cellulose polymer of formula I

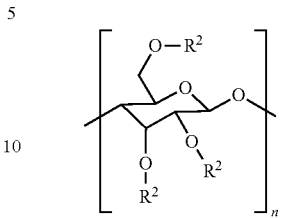

wherein n is an average of 308 to 9,252 (preferably, 555 to 6,167; more preferably, 3083 to 4,317); wherein each $R^2$ is independently selected from the group consisting of a hydrogen, a $C_{1-8}$ alkyl group and a —Si($R^1$)$_3$ group (preferably, a hydrogen, a $C_{1-4}$ alkyl group and a —Si($R^1$)$_3$ group; more preferably, a hydrogen, a $C_{1-2}$ alkyl group and a —Si($R^2$)$_3$ group; most preferably, a hydrogen and a —Si($R^1$)$_3$ group); wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group (preferably, a hydrogen and a $C_{1-8}$ alkyl group; more preferably, a $C_{1-4}$ alkyl group; still more preferably, a $C_{1-2}$ alkyl group; most preferably, a methyl group).

Preferably, the thickening polymer is a silylated cellulose polymer; wherein the silylated cellulose polymer comprises a cellulose polymer functionalized with —Si($R^1$)$_3$ groups having a degree of substitution, DS, of the —Si($R^1$)$_3$ groups of 1.4 to 3.0 (preferably, 1.5 to 3.0; more preferably, 1.5 to 2.9; most preferably, 1.7 to 2.7) determined by Attenuated Total Reflection-Fourier Transform Infrared (ATR-FTIR) Spectroscopy.

Preferably, the suncare formulation of the present invention comprises: a suncare active (preferably, 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of the suncare active); and a polymer/hydrophobic ester oil blend (preferably, 20 to 99.9 wt % (more preferably, 25 to 90 wt %; still more preferably, 30 to 75 wt %; most preferably, 35 to 55 wt %), based on weight of the suncare formulation, of the polymer/hydrophobic ester oil blend); wherein the polymer/hydrophobic ester oil blend, comprises: (a) a cosmetically acceptable hydrophobic ester oil (preferably, 75 to 99.9 wt % (more preferably, 80 to 99.7 wt %; still more preferably, 85 to 99.6 wt %; most preferably, 90 to 99.5 wt %), based on weight of the polymer/hydrophobic ester oil blend, of the cosmetically acceptable hydrophobic ester oil) (preferably, wherein the cosmetically acceptable hydrophobic ester oil comprises aliphatic $C_{6-30}$ alkyl triglyceride esters; more preferably, wherein the cosmetically acceptable hydrophobic ester oil comprises aliphatic $C_{8-28}$ alkyl triglyceride esters; still more preferably, wherein the cosmetically acceptable hydrophobic ester oil comprises aliphatic $C_{10-25}$ alkyl triglyceride esters; most preferably, wherein the cosmetically acceptable hydrophobic ester oil includes is caprylic/capric triglyceride ester oil); (b) a thickening polymer (preferably, 0.10 to 25 wt % (more preferably, 0.3 to 20 wt %; still more preferably, 0.4 to 15 wt %; most preferably, 0.5 to 10 wt %), based on weight of the polymer/hydrophobic ester oil blend, of the thickening polymer), wherein the thickening polymer is a silylated cellulose polymer, comprising a cellulose polymer functionalized with —Si($R^1$)$_3$ groups; wherein each $R^1$ is independently selected from the group consisting of a hydrogen, a $C_{1-8}$ alkyl group, a $C_{1-8}$ haloalkyl group, an aryl group, a $C_{1-8}$ alkylaryl group and a $C_{1-8}$ haloalkylaryl group (preferably, a hydrogen and a $C_{1-8}$ alkyl group; more preferably, a $C_{1-4}$ alkyl group; still more preferably, a $C_{1-2}$ alkyl group; most preferably, a methyl group).

Preferably, the suncare formulation of the present invention, comprises a suncare active. More preferably, the suncare formulation of the present invention, comprises: 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of a suncare active. Still more preferably, the suncare formulation of the present invention, comprises 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of a suncare active; wherein the suncare active is selected from the group including UV blockers (e.g., red petrolatum, titanium dioxide, zinc oxide) and UV absorbing agents (e.g., 1-(4-methoxyphenol)-3-(4-tert-butylphenyl)propane-1,3-dione (INCI: Avobenzone), 2-hydroxy-4-methoxybenzophenone (INCI: Oxybenzone); dioxybenzone; sulisobenzone; menthyl anthranilate; para-aminobenzoic acid; amyl paradimethylaminobenzoic acid; octyl para-dimethylaminobenzoate; ethyl 4-bis (hydroxypropyl) para-aminobenzoate; polyethylene glycol (PEG-25) para-aminobenzoate; ethyl 4-bis (hydroxypropyl) aminobenzoate; diethanolamine para-methyoxycinnamate; 2-ethoxyethyl para-methoxycinnamate; ethylhexyl para-methoxycinnamate; octyl para-methoxycinnamate; isoamyl para-methoxycinnamate; 2-ethylhexyl-2-cyano-3,3-diphenyl-acrylate; 2-ethylhexyl-2-cyano-3,3-diphenyl-2-propenoate (INCI: Octocrylene); 2-ethylhexyl salicylate (INCI: Octisalate); homomenthyl salicylate; glyceryl aminobenzoate; triethanolamine salicylate; digalloyl trioleate; lawsone with dihydroxyacetone; 2-phenylbenzimidazole-5-sulfonic acid; 4-methylbenzylidine camphor; avobenzone; triazines; benzotriazoles; vinyl group-containing amides; cinnamic acid amides; sulfonated benzimidazoles; 3,3,5-trimethylcyclohexyl-2-hydroxybenzoate (INCI: Homosalate)). Yet more preferably, the suncare formulation of the present invention, comprises 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of a suncare active; wherein the suncare active comprises a mixture of UV absorbing agents. Yet still more preferably, the suncare formulation of the present invention, comprises 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of a suncare active; wherein the suncare active is a mixture of UV absorbing agents including at least one of 1-(4-methoxyphenol)-3-(4-tert-butylphenyl)propane-1,3-dione (INCI: Avobenzone); 2-ethylhexyl 2-hydroxybenzoate (INCI: Octisalate); 2-ethylhexyl-2-cyano-3,3-diphenyl-2-propenoate (INCI: Octocrylene); 3,3,5-trimethylcyclohexyl-2-hydroxybenzoate (INCI: Homosalate) and 2-hydroxy-4-methoxybenzophenone (INCI: Oxybenzone). Most preferably, the suncare formulation of the present invention, comprises 0.1 to 60 wt % (more preferably, 1 to 50 wt %; yet more preferably, 5 to 45 wt %; still more preferably, 10 to 40 wt %; most preferably, 20 to 30 wt %), based on weight of the suncare formulation, of a suncare active; wherein the suncare active is a mixture of UV absorbing agents including 1-(4-methoxyphenol)-3-(4-tert-butylphenyl)propane-1,3-dione (INCI: Avobenzone); 2-ethyhexyl-2-cyano-3,3-diphenyl-2-propenoate (INCI: Octocrylene); 2-ethylhexyl 2-hydroxybenzoate (INCI: Octisalate); and 3,3,5-trimethylcyclohexyl-2-hydroxybenzoate (INCI: Homosalate).

Preferably, the suncare formulation of the present invention optionally further comprises at least one personal care additive selected from the group consisting of aesthetic modifiers; antifoaming agents; antimicrobial agents (e.g., iodopropyl butylcarbamate); antioxidants; binders; buffering agents; color ingredient; consistency factors; emollients; emulsifiers; essential oils; fats; fatty alcohols; film forming agents; foam builders; fragrances; humectants; lectins; oils; opacifying agents; pearlizers; pH adjusters; phospholipids; polymers; preservatives; propellants; water proofing agents; rheology modifiers; silicones; skin protectants; skin sensates; skin soothing agents (e.g., panthenol, aloe vera, pantothenic acid, allantoin, bisabolol, dipotassium glycyrrhizinate); SPF boosters; stabilizers; super fatting agents; surfactants; thickeners; topical analgesics; vitamins (e.g., Vitamin C); waxes; and mixtures thereof.

Preferably, the suncare formulation of the present invention, optionally further comprises an emollient. More preferably, the suncare formulation of the present invention, optionally further comprises 0 to 60 wt % (preferably, 5 to 50 wt %; more preferably, 10 to 45 wt %; most preferably, 20 to 40 wt %), based on weight of the suncare formulation, of an emollient. Still more preferably, the suncare formulation of the present invention, optionally further comprises 0 to 60 wt % (preferably, 5 to 50 wt %; more preferably, 10 to 45 wt %; most preferably, 20 to 40 wt %), based on weight of the suncare formulation, of an emollient; wherein the emollient is selected from the group consisting of petrolatum, mineral oil, polydecene, isohexadecane, $C_{12-15}$ alkyl benzoate, dioctyladipate, octyl stearate, octyldodecanol, hexyl laurate, octyldodecyl neopentanoate, cyclomethicone, dicapryl ether, dimethicone, phenyl trimethicone, isopropyl myristate, cyclomethicones and mixtures thereof. Most preferably, the suncare formulation of the present invention, optionally further comprises 0 to 60 wt % (preferably, 5 to 50 wt %; more preferably, 10 to 45 wt %; most preferably, 20 to 40 wt %), based on weight of the suncare formulation, of an emollient; wherein the emollient is selected from the group consisting of $C_{12-15}$ alkyl benzoate, isopropyl myristate and mixtures thereof.

Preferably, the suncare formulation of the present invention, further comprises a film forming agent. More preferably, the suncare formulation of the present invention, further comprises 0 to 7 wt % (preferably, 0.5 to 5 wt %; more preferably, 0.75 to 4 wt %), based on weight of the suncare formulation, of a film forming agent; wherein the film forming agent is capable, by itself or in the presence of an auxiliary, of forming a macroscopically continuous film on a support especially on keratin materials (preferably, wherein the film is a cohesive film; more preferably, wherein the film exhibits cohesive properties coupled with sufficient mechanical properties such that the film can be isolated from the support). Most preferably, the suncare formulation of the present invention, further comprises 0.5 to 7 wt % (preferably, 0.6 to 5 wt %; more preferably, 0.75 to 4 wt %), based on weight of the suncare formulation, of a film forming agent; wherein the film forming agent is selected to provide a film barrier upon application of the aqueous suncare formulation of the present invention to skin. The purpose of the film barrier is to help maintain the UV radiation absorbing agents on the skin following immersion in water.

Preferred film forming agents include petrolatum, emollient esters, lanolin derivatives (e.g., acetylated lanolins), superfatted oils, silicone gum, silicone elastomer, silicone resin, phenyl functionalized silicones, silicone acrylates, dimethicone derivatives, natural and synthetic oils, fatty acids, fatty alcohols, waxes, acrylic copolymers, polyamides, polyesters, polysaccharides, acrylate polymers and mixtures thereof.

Acrylic copolymers include acrylamide/acrylic copolymers (e.g., Dermacryl® 79 (INCI: Acrylates/Octyacrylamide copolymer) available from National Starch and Chemical); acrylates copolymers (e.g., EPITAX™ 66 powder water resistant polymer (INCI: acrylates copolymer) available from The Dow Chemical Company).

Certain emollients also exhibit film forming functionality by providing a water-resistant barrier on skin. Emollients with film forming behavior include butyloctyl salicylate (e.g., HallBrite® BHB available form HallStar); fatty acids (e.g., oleic, stearic); fatty alcohols (e.g., cetyl, hexadecyl); esters (e.g., 2,2-dimethyl-1,3-propanediyl diheptanoate (INCI: neopentyl glycol diheptanoate)); alkanes (e.g., mineral oil); ethers (e.g., polyoxypropylene butyl ethers, polyoxypropylene cetyl ethers); natural oils and synthetic oils (including silicone oils).

Preferably, the suncare formulation of the present invention, further comprises: a color ingredient. More preferably, the suncare formulation of the present invention, further comprises a color ingredient; wherein the color ingredient is selected from the group consisting of inorganic pigments, dyes, organic pigments, aqueous pigment dispersions and mixtures thereof. Still more preferably, the suncare formulation of the present invention, further comprises a color ingredient; wherein the color ingredient is selected from the group consisting of Ext. D&C Yellow No. 2, Ext. D & C Violet No. 2, FD&C Red No. 4, FD&C Red No. 40, FD&C Yellow No. 5, FD&C Yellow No. 6, FD&C Green No. 3, FD&C Blue No. 1, D&C Yellow No. 7, D&C Yellow No. 8, D&C Yellow No. 10, D&C Yellow No. 11, D&C Violet No. 2, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 34, D&C Red No. 33, D&C Red No. 36, D&C Green No. 5, D&C Green No. 6, D&C Green No. 8, D&C Blue No. 4, D&C Orange No. 4, D&C Orange No. 5, D&C Orange No. 10, D&C Orange No. 11, D&C Brown No. 1, Aluminum powder, Annatto, Bismuth citrate, Bismuth Oxychloride, Bronze powder, Caramel, Carmine, (3-Carotene, Chromium hydroxide green, Chromium oxide green, Copper chlorophyllin, Copper powder, Dihydroxyacetone, Ferric Ammonium ferrocyanide, Ferric ferrocyanide, Guanine, Iron oxide, Manganese Violet, Mica, Silver, Titanium Dioxide, Ultramarine, Zinc Oxide and mixtures thereof. Still more preferably, the suncare formulation of the present invention, further comprises a color ingredient; wherein the color ingredient includes at least one iron oxide and titanium dioxide. Most preferably, the suncare formulation of the present invention, further comprises a color ingredient; wherein the color ingredient includes titanium dioxide and a mixture of iron oxides.

Preferred propellants for use in the suncare formulation of the present invention, include methane, ethane, propane, isobutane, n-butane, dimethyl ether, diethyl ether, fluoro containing materials (e.g., 1,1-difluoroethane, ethyl perfluoroisobutyl ether, ethyl perfluorobutyl ether, methyl perfluoroisobutyl ether, methyl perfluorobutyl ether) and mixtures thereof. Preferred fluoro containing propellants include Cosmetic Fluid CF-76 (INCI designation: ethyl perfluorobutyl ether/ethyl perfluoroisobutyl ether) and Cosmetic Fluid CF-61 (INCI designation: methyl perfluorobutyl ether/methyl perfluoroisobutyl ether).

Preferably, the suncare formulation of the present invention, further comprises 0 to 20 wt % (preferably, 0.5 to 15 wt %; more preferably, 1 to 10 wt %; most preferably, 2 to 5 wt %), based on weight of the suncare formulation, of an SPF booster. Preferably, the SPF booster is not an active ingredient, but is designed to enhance the effectiveness of the suncare active ingredient(s) present in the formulation. Suitable SPF boosters include, but are not limited to, styrene/acrylates copolymer, sodium bentonite, highly purified white sodium bentonite, montmorillonite, hydrogel, crystalline cellulose, silica, wax particles or any combinations thereof.

Preferably, the suncare formulation of the present invention is provided in a product form selected from the group consisting of a cream, an aqueous solution, an oil, an ointment, a paste, a gel, a lotion, a milk, a foam, a stick and a suspension.

Optionally, the suncare formulation of the present invention is formulated for application to skin using a mechanical device (e.g., manual pump spray containers, squeeze bottles) or a pressurized aerosol container (e.g., bag-on-nozzle container, pressurized can) to generate a spray.

Preferably, the suncare formulation of the present invention are useful for the protection of skin. Preferably, the suncare formulations of the present invention are useful for the protecting skin from UV damage from exposure to the sun. The suncare formulations of the present invention also preferably provide prevention and treatment of dry skin, protection of sensitive skin, improvement of skin tone and texture, masking imperfections, and inhibition of transepidermal water loss. The suncare formulations of the present invention can be used in a method for protecting skin from UV damage comprising topically administering the suncare formulation to the skin.

Preferably, the method of protecting skin from UV damage from exposure to the sun, comprises: providing a suncare formulation of the present invention and applying the suncare formulation to a skin (preferably, mammalian skin; more preferably, human skin).

Some embodiments of the present invention will now be described in detail in the following Examples.

Examples S1-S26: Synthesis of Thickening Polymer

To a two liter three-neck flask equipped with a nitrogen inlet and a temperature controller was weighed the type and amount of cellulose noted in TABLE 1. Then N,N-dimethylacetamide (DMAc) solvent was added to the flask in the amount noted in TABLE 1. The flask contents were then placed under an atmosphere of nitrogen. Then hexamethyldisilazane (HMDS) was added to the flask contents all at once in the amount noted in TABLE 1. The flask contents were then slowly heated while stirring to the set temperature, $T_1$, noted in TABLE 1 and stirred for time, $t^1$, in hours noted in TABLE 1. The heat source was then removed and the flask contents were left to cool. Then xylene (Xyl) was added to the flask contents in the amount noted in TABLE 1 and the flask contents were then heated to set temperature, $T_2$, noted in TABLE 1 and stirred for time, $t^2$, in hours noted in TABLE 1. The product solution was then transferred to a separatory funnel and subjected to non-solvent precipitation by dropwise addition into two liters of vigorously stirring methanol. The product was precipitated in the form of a thread or flakes. The product was isolated by filtration, and the product was dried in a vacuum oven at 50° C. overnight. The product was then suspended in 500 mL of methanol and left overnight, then refiltered and dried in vacuum oven at 50° C. overnight.

TABLE 1

| Example | Cellulose Type | Cellulose (g) | DMAc (g) | HMDS (g) | $T_1$ (° C.) | $t^1$ (hr) | Xyl (g) | $T_2$ (° C.) | $t^2$ (hr) |
|---|---|---|---|---|---|---|---|---|---|
| S1 | A | 15.2 | 300 | 40.0 | 140 | 3.0 | 400 | 140 | 4.0 |
| S2 | B | 15.2 | 330 | 50.0 | 140 | 2.0 | 320 | 140 | 4.0 |
| S3 | B | 15.2 | 400 | 50.0 | 140 | 2.0 | 600 | 140 | 4.0 |
| S4 | A | 15.0 | 300 | 50.0 | 130 | 5.0 | 300 | 140 | 6.0 |
| S5 | C | 15.1 | 330 | 49.9 | 130 | 7.5 | 400 | 125 | 5.0 |
| S6 | D | 15.0 | 331 | 49.8 | 130 | 7.5 | 400 | 125 | 5.0 |
| S7 | E | 15.0 | 330 | 50.0 | 130 | 5.0 | 400 | 140 | 6.0 |
| S8 | C | 15.2 | 333 | 149.9 | 135 | 3.5 | 400 | 135 | 5.0 |
| S9 | D | 15.1 | 332 | 150.1 | 135 | 3.5 | 400 | 135 | 5.0 |
| S10 | F | 15.5 | 329 | 49.7 | 135 | 5.0 | 400 | 120 | 3.0 |
| S11 | G | 15.4 | 329 | 50.0 | 135 | 5.0 | 400 | 120 | 3.0 |
| S12 | C | 2.0 | 39 | 5.96 | 130 | 4.0 | 0 | — | — |
| S13 | H | 15.2 | 337 | 50.1 | 135 | 6.0 | 400 | 135 | 3.5 |
| S14 | G | 15.2 | 315 | 49.7 | 135 | 4.0 | 400 | 130 | 3.0 |
| S15 | G | 15.2 | 308 | 50.2 | 135 | 4.0 | 400 | 130 | 3.0 |
| S16 | G | 15.2 | 315 | 98.7 | 80 | 4.0 | 300 | 130 | 5.5 |
| S17 | G | 15.3 | 308 | 99.0 | 80 | 4.0 | 320 | 130 | 5.5 |
| S18 | F | 15.1 | 312 | 50.0 | 130 | 5.0 | 400 | 105 | 8.0 |
| S19 | G | 15.2 | 324 | 50.2 | 130 | 5.0 | 400 | 105 | 8.0 |
| S20 | E | 15.2 | 318 | 49.9 | 130 | 4.0 | 330 | 130 | 5.0 |
| S21 | C | 15.0 | 328 | 49.6 | 130 | 4.0 | 330 | 130 | 5.0 |
| S22 | G | 15.2 | 329 | 19.9 | 130 | 4.0 | 330 | 120 | 2.0 |
| S23 | G | 15.2 | 326 | 30.0 | 130 | 4.0 | 330 | 120 | 2.0 |
| S24 | A | 15.2 | 327 | 49.9 | 130 | 4.0 | 330 | 130 | 4.0 |
| S25 | A | 15.2 | 378 | 49.9 | 130 | 4.0 | 330 | 130 | 4.0 |

A Avicel PH-101 (51 μm) microcrystalline cellulose having weight average molecular weight of 60,000 Daltons available from Sigma-Aldrich
B Crystal PL HD eucalyptus pulp having weight average molecular weight of 400,000 Daltons available from Bahi Specialty Cellulose
C Biofloc 92 MV wood pulp having weight average molecular weight of 600,000 Daltons available from Tartas (Rayonier)
D Biofloc XV wood pulp having weight average molecular weight of 900,000 Daltons available from Tartas (Rayonier)
E PCS-2400 cotton linters having weight average molecular weight of 1,000,000 Daltons available from Gaomi
F E4 wood pulp having weight average molecular weight of 100,000 Daltons available from GP Cellulose
G E60-HB wood pulp having weight average molecular weight of 125,000 Daltons available from GP Cellulose
H Biofloc 94 MV wood pulp having weight average molecular weight of 600,000 Daltons available from Tartas (Rayonier)

DS Determination

The degree of substitution, DS, of —Si(CH$_3$)$_3$ in the thickening polymers prepared according to Examples S1-S25 was determined using well known techniques based on Attenuated Total Reflection-Fourier Transform Infrared Spectroscopy analyzing spectra peak areas calculated with MATLAB using the spectral parameters provided in TABLE 2 with the DS values determined as reported in TABLE 3.

TABLE 2

| | Integration (cm$^{-1}$) | | Baseline (cm$^{-1}$) | |
|---|---|---|---|---|
| Species | Start | End | Start | End |
| —Si(CH$_3$)$_3$ | 1277 | 1220 | 1278 | 1219 |
| —OH | 3685 | 3033 | 3697 | 3040 |

TABLE 3

| | IR Peak Area | | | | Si | OH |
|---|---|---|---|---|---|---|
| Example | Si(CH$_3$)$_3$ | CO | OH | DS | (wt %) | (wt %) |
| S2 | 1.28 | 9.92 | 0.264 | 2.58 | 20.8 | 2.04 |
| S3 | 1.47 | 12.0 | 0.686 | 2.20 | 19.2 | 4.26 |
| S4 | 1.44 | 13.3 | 1.59 | 1.61 | 16.2 | 8.49 |
| S5 | 0.963 | 7.35 | 0.426 | 2.23 | 19.4 | 4.07 |
| S6 | 1.62 | 12.8 | 0.714 | 2.23 | 19.4 | 4.06 |
| S7 | 0.597 | 4.95 | 0.351 | 2.05 | 18.6 | 5.19 |
| S8 | 0.938 | 7.24 | 0.282 | 2.43 | 20.2 | 2.89 |
| S9 | 0.760 | 6.51 | 0.382 | 2.15 | 19.0 | 4.54 |
| S10 | 1.08 | 8.49 | 0.248 | 2.54 | 20.6 | 2.26 |
| S11 | 1.03 | 7.67 | 0.0194 | 2.96 | 22.1 | 0.20 |
| S12 | 1.13 | 7.84 | −0.0337 | 3.00 | 22.2 | 0 |
| S13 | 0.811 | 8.81 | 1.51 | 1.22 | 13.7 | 12.1 |
| S14 | 1.63 | 12.6 | 0.237 | 2.69 | 21.2 | 1.47 |
| S15 | 2.12 | 15.3 | −0.151 | 3.00 | 22.2 | 0 |
| S16 | 1.34 | 9.58 | −0.00681 | 3.00 | 22.2 | 0 |
| S17 | 0.623 | 4.47 | 0.0535 | 2.81 | 21.6 | 0.88 |
| S18 | 0.933 | 6.84 | 0.102 | 2.76 | 21.4 | 1.11 |
| S19 | 1.08 | 7.82 | 0.215 | 2.60 | 20.8 | 1.97 |
| S20 | 1.33 | 9.27 | −0.0648 | 3.00 | 22.2 | 0 |

TABLE 3-continued

| Example | IR Peak Area | | | DS | Si (wt %) | OH (wt %) |
|---|---|---|---|---|---|---|
| | Si(CH$_3$)$_3$ | CO | OH | | | |
| S21 | 0.491 | 3.48 | −0.00282 | 3.00 | 22.2 | 0 |
| S22 | 0.205 | 2.09 | 0.165 | 1.84 | 17.5 | 6.70 |
| S23 | 1.11 | 8.44 | 0.248 | 2.55 | 20.7 | 2.20 |
| S24 | 0.728 | 10.5 | 2.92 | 0.72 | 9.47 | 18.1 |
| S25 | 2.022 | 15.1 | −0.218 | 3.00 | 22.2 | 0 |

Comparative Examples C1-C3 and Examples 1-14: Sunscreen Oil Formulations

The sunscreen oil formulations of Comparative Examples C1-C3 and Examples 1-14 having the compositions noted in TABLE 4 were prepared as follows. The sunscreen oil formulation of Comparative Example C1 was prepared by heating the caprylic/capric triglycerides to 70° C. and then adding the remaining components with mixing while maintaining the formulation set point temperature at 70° C. The sunscreen oil formulations of Examples 1-14 were prepared by first combining the caprylic/capric triglycerides and the thickening polymer and mixing while heating at 70° C. for three hours before adding the other formulation components with mixing while maintaining a set point formulation temperature of 70° C. The sunscreen oil formulations of Comparative Examples C2-C3 were prepared by first melting the thickener at 80° C. and then the caprylic/capric triglycerides were added; once the mixture was uniform, the remaining formulation components were added with mixing with a formulation set point temperature of 70° C. The formulations were all allowed to cool to room temperature before further testing.

Thicker Solubility in Sunscreen Formulations

The solubility of the thickeners used in Comparative Examples C2-C3 and Examples 1-14 was observed and is reported in TABLE 5. The thickeners were observed to be fully soluble in the sunscreen formulations or the thickeners swelled in the formulation and exhibited certain levels of insolubility or phase separation.

TABLE 5

| Example | Thickener | Solubility |
|---|---|---|
| C2 | EstoGel[1] | full |
| C3 | OleoCraft LP-20[2] | full |
| 1 | Example S4 | partial |
| 2 | Example S5 | partial |
| 3 | Example S8 | full |
| 4 | Example S9 | full |
| 5 | Example S10 | full |
| 6 | Example S11 | partial |
| 7 | Example S14 | partial |
| 8 | Example S15 | partial |
| 9 | Example S16 | partial |
| 10 | Example S17 | partial |
| 11 | Example S18 | partial |
| 12 | Example S20 | partial |
| 13 | Example S21 | partial |
| 14 | Example S22 | partial |

[1]INCI: Castor oil/IPDI Copolymer & Caprylic/Capric triglyceride available from Polymerexpert SA
[2]INCI: Polyamide-8 available from Croda Thickening and Shear Thinning The viscosity of the fully soluble systems was determined using a TA Instruments DHR-3 rheometer at 25° C., equipped with a stainless steel 60 mm, 0.5° cone and plate

TABLE 4

| Ex. | Thickener Used | Thickener | a | b | c | d | e | f | g |
|---|---|---|---|---|---|---|---|---|---|
| C1 | None | — | 3.0 | 10.0 | 4.0 | 8.0 | 15.0 | 45.0 | 15.0 |
| C2 | EstoGel[1] | 3.0 | 3.0 | 10.0 | 4.0 | 8.0 | 15.0 | 42.0 | 15.0 |
| C3 | OleoCraft LP-20[2] | 3.0 | 3.0 | 10.0 | 4.0 | 8.0 | 15.0 | 42.0 | 15.0 |
| 1 | Example S4 | 3.0 | 3.0 | 10.0 | 4.0 | 8.0 | 15.0 | 42.0 | 15.0 |
| 2 | Example S5 | 3.0 | 3.0 | 10.0 | 4.0 | 8.0 | 15.0 | 42.0 | 15.0 |
| 3 | Example S8 | 3.0 | 3.0 | 10.0 | 4.0 | 8.0 | 15.0 | 42.0 | 15.0 |
| 4 | Example S9 | 3.0 | 3.0 | 10.0 | 4.0 | 8.0 | 15.0 | 42.0 | 15.0 |
| 5 | Example S10 | 3.0 | 3.0 | 10.0 | 4.0 | 8.0 | 15.0 | 42.0 | 15.0 |
| 6 | Example S11 | 3.0 | 3.0 | 10.0 | 4.0 | 8.0 | 15.0 | 42.0 | 15.0 |
| 7 | Example S14 | 3.0 | 3.0 | 10.0 | 4.0 | 8.0 | 15.0 | 42.0 | 15.0 |
| 8 | Example S15 | 3.0 | 3.0 | 10.0 | 4.0 | 8.0 | 15.0 | 42.0 | 15.0 |
| 9 | Example S16 | 3.0 | 3.0 | 10.0 | 4.0 | 8.0 | 15.0 | 42.0 | 15.0 |
| 10 | Example S17 | 3.0 | 3.0 | 10.0 | 4.0 | 8.0 | 15.0 | 42.0 | 15.0 |
| 11 | Example S18 | 3.0 | 3.0 | 10.0 | 4.0 | 8.0 | 15.0 | 42.0 | 15.0 |
| 12 | Example S20 | 3.0 | 3.0 | 10.0 | 4.0 | 8.0 | 15.0 | 42.0 | 15.0 |
| 13 | Example S21 | 3.0 | 3.0 | 10.0 | 4.0 | 8.0 | 15.0 | 12.0 | 15.0 |
| 14 | Example S22 | 3.0 | 3.0 | 10.0 | 4.0 | 8.0 | 15.0 | 42.0 | 15.0 |

[1]INCI: Castor oil/IPDI Copolymer & Caprylic/Capric triglyceride available from Polymerespert SA
[2]INCI: Polyamide-8 available from Croda
a Parsol 1789 Avobenzone available from DSM
b Parsol HMS Homosalate available from DSM
c Parsol EHS Octisalate available from DSM
d Parsol 340 Octocrylene available from DSM
e Ritamollient TN C$_{12-15}$ alkyl benzoate available from Rita
f Ritamollient CCT caprylic/capric triglyceride available from Rita
g Crodamol IPM isopropyl myristate available from Croda sensor, a gap set at 17 microns and a shear rate of 6.31 s$^{-1}$. Shear sweep method was used with shear rate ranges from 0.01 s$^{-1}$ to 100 s$^{-1}$. Viscosities measured at low shear (0.1 s$^{-1}$) and at high shear (100 s$^{-1}$) are reported in TABLE 6.

The shear thinning efficiency of the thickeners was assessed by fitting the viscosity data to the power-law fluid equation $$\eta = K \cdot \gamma^{n-1}$$

wherein $\eta$ is the viscosity, $\gamma$ is the shear rate, K is the flow consistency index and n is the flow behavior index. For a shear thinning fluid, n<1. Smaller n values indicate a higher degree of shear thinning. The calculated shear thinning efficiencies for the thickeners is reported in TABLE 6.

As shown in TABLE 6, data for all of the thickeners fitted well to the power-law fluid equation, with the r$^2$ value being close to 1. The flow behavior index (n) for the inventive thickeners was much lower than the commercial materials (EstoGel and OleoCraft LP-20), indicating a much higher degree of sheer thinning which is highly favorable in personal care formulations for better sprayability and spreadability of the formulation. The inventive thickener also led to a much higher increase in formulation viscosity than the commercial materials (EstoGel and OleoCraft LP-20), indicating a much higher thickening efficiency as a rheology modifier for personal care application.

TABLE 6

| Sunscreen | Thickener | Viscosity (Pa·s) 0.01 s$^{-1}$ | Viscosity (Pa·s) 100 s$^{-1}$ | Fitted power law equation | Flow index, n behavior |
|---|---|---|---|---|---|
| C1 | None | 5.4 | 0.01 | $\eta = 0.229 \cdot \gamma^{-0.623}$<br>$r^2 = 0.9647$ | 0.377 |
| C2 | EstoGel$^1$ | 133 | 0.19 | $\eta = 3.8 \cdot \gamma^{-0.72}$<br>$r^2 = 0.9904$ | 0.280 |
| C3 | OleoCraft LP-20$^2$ | 193 | 0.13 | $\eta = 2.78 \cdot \gamma^{-0.723}$<br>$r^2 = 0.9879$ | 0.277 |
| 3 | Example S8 | 72,007 | 7.00 | $\eta = 915.54 \cdot \gamma^{-1.045}$<br>$r^2 = 0.9984$ | −0.05 |
| 4 | Example S9 | 6,766 | 1.71 | $\eta = 110.23 \cdot \gamma^{-0.972}$<br>$r^2 = 0.9969$ | 0.280 |
| 5 | Example S10 | 56,324 | 2.70 | $\eta = 481.57 \cdot \gamma^{-1.136}$<br>$r^2 = 0.9993$ | −0.136 |

Water and Sebum Repellency

Water and sebum repellency of a given film are dominated by surface energy. High water and sebum repellency for a prolonged period is desired in a variety of personal care applications (e.g., providing long lasting active deposition and rub-off resistance benefits, especially in color cosmetics, sunscreens and anti-pollution products). The water and sebum repellency can be evaluated by measuring the water contact angle and sebum contact angle from the surface of a film. Specifically, films were prepared from the thickeners noted in TABLE 8 by drawdown with a doctor blade with a 3 mil gap on a black plastic chart (available from LENETA P121-16). The drawn films were air dried in an environmental controlled room (72° F. and 50% RH) for at least 72 hours. The dried films were then placed into a fog box for at least 48 hours to remove any residual surfactants from the film surface. After treatment in the fog box, the films were air dried in an environmental controlled room (72° F. and 50% RH) at least 24 hours before making measurements. Both water and sebum repellency was observed for the films as noted in TABLE 8. For the sebum repellency, an artificial sebum solution was prepared having the composition noted in TABLE 7.

TABLE 7

| Ingredient | Weight % |
|---|---|
| Glyceryl trioleate$^1$ | 60 |
| Oleic acid$^2$ | 20 |
| Squalane$^3$ | 20 |

$^1$(65% solution) available from Sigma-Aldrich
$^2$(90% solution) available from Sigma-Aldrich
$^3$available from Sigma-Aldrich

TABLE 8

| | Repellency | |
|---|---|---|
| Thickener/Film former | Water | Sebum |
| Natpure Film GR1 | Good | Poor |
| ETHOCEL ™ 7 Std Premium$^2$ | Good | Good |
| DOWSIL ™ FA 4002 ID Silicone Acrylate$^3$ | Excellent | Excellent |
| Example S2 | Excellent | Excellent |

$^1$INCI: Glyceryl rosinate (and) aqua (and) cellulose (and) sodium sulfate available from Sensient Cosmetic Technologies
$^2$Film forming additive available from The Dow Chemical Company
$^3$INCI: Isododecane (and) acrylates/polytrimethylsiloxymethacrylate copolymer available from The Dow Chemical Company

Rub Off Resistance

Films were prepared from the thickener/film formers noted in TABLE 9 by coating on collagen at 50 μm using an automatic coater and a rectangular applicator. The deposited films were air dried in an environmental controlled room (72° F. and 50% RH) overnight. The collagen was punched and adhered to an XRF cylindrical holder using double sided tape. Initial L, a, b values were measured using a color spectrophotometer from BYK-Gardner (Germany). The ΔE values for the films were calculated from the measured L, a and b values. The XRF cylinder was then placed on a felt band (thickener/film coating touching the band) and run through using a washability tester (Braive Instruments S.A., Belgium). The felt band was changed between each rub-off cycle. The results of the rub-off tests are provided in TABLE 9. The rub off resistance (aka wear resistance) is directly related to the ΔE over rub off cycle. The lower the ΔE, the better the resistance to wear.

Film Integrity

Films were prepared from the thickener/film formers noted in TABLE 9 by coating on collagen at 50 μm using an automatic coater and a rectangular applicator. The deposited films on collagen were air dried in an environmental controlled room (72° F. and 50% RH) overnight and then fixed on a Payne cup containing 4 g of a known concentration of blue ink and offering a 10 cm$^2$ diffusion area. The cup was turned upside-down into a crystallizer containing 300 g of water. The water was then stirred at 1,500 rpm for 6 hours. The film integrity was directly related to the blue intensity of the water contained in the crystallizing dish after the 6 hours. The clearer the water remains, the better the film integrity. The dye concentration in the crystallized was determined using a UV spectrophotometer. For each film, the integrity was evaluated on two separate coated collagen sheets. The results are provided in TABLE 9. The film integrity is directly related to the blue intensity of the water over time. The clearer the water, the better the film integrity.

TABLE 9

| Thickener/Film former | Rub-off resistance | | Film integrity after | |
|---|---|---|---|---|
| | Without sebum | With Sebum | 1 hr | 6 hr |
| Natpure Film GR[1] | Poor | Good | Excellent | Excellent |
| ETHOCEL ™ 7 Std Premium[2] | Good | Fair | Excellent | Excellent |
| DOWSIL ™ FA 4002 ID Silicone Acrylate[3] | Excellent | Excellent | Good | Fair |
| Example S2 | Excellent | Excellent | Excellent | Good |

[1]INCI: Glyceryl rosinate (and) aqua (and) cellulose (and) sodium sulfate available from Sensient Cosmetic Technologies
[2]Film forming additive available from The Dow Chemical Company
[3]INCI: Isododecane (and) acrylates/polytrimethylsiloxymethacrylate copolymer available from The Dow Chemical Company

We claim:

1. A polymer/hydrophobic ester oil blend, wherein the polymer/hydrophobic ester oil blend is a suncare formulation comprising:
   (a) a cosmetically acceptable hydrophobic ester oil; and
   (b) a thickening polymer, wherein the thickening polymer is a silylated cellulose polymer, comprising a cellulose polymer functionalized with —Si(R$^1$)$_3$ groups; wherein each R$^1$ is independently selected from the group consisting of a hydrogen, a C$_{1-8}$ alkyl group, a C$_{1-8}$ haloalkyl group, an aryl group, a C$_{1-8}$ alkylaryl group and a C$_{1-8}$ haloalkylaryl group; and
   wherein the unfunctionalized cellulose polymer has a weight average molecular weight of 50,000 to 1,500,000 Daltons; and
   (c) a suncare active, wherein the suncare active is a UV radiation absorbing agent selected from the group consisting of red petrolatum; titanium dioxide; zinc oxide; 1-(4-methoxyphenyl)-3-(4-tert-butylphenyl) propane-1,3-dione; 2-hydroxy-4-methoxybenzophenone; dioxybenzone; sulisobenzone; menthyl anthranilate; para-aminobenzoic acid; amyl paradimethylaminobenzoic acid; octyl para-dimethylaminobenzoate; ethyl 4-bis (hydroxypropyl) para-aminobenzoate; polyethylene glycol (PEG-25) para-aminobenzoate; ethyl 4-bis (hydroxypropyl) aminobenzoate; diethanolamine para-methyoxycinnamate; 2-ethoxyethyl para-methoxycinnamate; ethylhexyl para-methoxycinnamate; octyl para-methoxycinnamate; isoamyl para-methoxycinnamate; 2-ethylhexyl-2-cyano-3,3-diphenyl-acrylate: 2-ethylhexyl-2-cyano-3,3-diphenyl-2-propenoate; 2-ethylhexyl-2-hydroxybenzoate; homomenthyl salicylate; glyceryl aminobenzoate; triethanolamine salicylate; digalloyl trioleate; lawsone with dihydroxyacetone; 2-phenylbenzimidazole-5-sulfonic acid; 4-methylbenzylidine camphor; avobenzone; triazines; benzotriazoles: vinyl group-containing amides; cinnamic acid amides; sulfonated benzimidazoles); 3,3,5-trimethylcyclohexyl-2-hydroxybenzoate and mixtures thereof.

2. The polymer/hydrophobic ester oil blend of claim 1, wherein the silylated cellulose polymer is of formula I

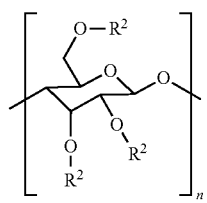

wherein n is an average of 308 to 9,252; wherein each R$^2$ is independently selected from the group consisting of a hydrogen, a C$_{1-8}$ alkyl group and a —Si(R$^1$)$_3$ group; wherein each R$^1$ is independently selected from the group consisting of a hydrogen, a C$_{1-8}$ alkyl group, a C$_{1-8}$ haloalkyl group, an aryl group, a C$_{1-8}$ alkylaryl group and a C$_{1-8}$ haloalkylaryl group.

3. The suncare formulation of claim 1, wherein the suncare active is a UV radiation absorbing agent is a mixture of UV absorbing agents including 1-(4-methoxyphenol)-3-(4-tert-butylphenyl) propane-1,3-dione; 2-ethylhexyl-2-hydroxybenzoate; 2-ethyhexyl-2-cyano-3,3-diphenyl-2-propenoate and 3,3,5-trimethylcyclohexyl-2-hydroxybenzoate.

4. The suncare formulation of claim 3, wherein the cosmetically acceptable hydrophobic ester oil comprises aliphatic C$_{10-25}$ alkyl triglyceride esters.

5. The suncare formulation of claim 4, wherein each R$^1$ is a methyl group.

6. The suncare formulation of claim 5, further comprising an additive selected from the group consisting of abrasives, absorbents, fragrances, pigments, colorings/colorants, essential oils, skin sensates, astringents, preservatives, anti-caking agents, foam builders, antifoaming agents, antimicrobial agents, antioxidants, binders, biological additives, buffering agents, bulking agents, chelating agents, chemical additives, cosmetic astringents, cosmetic biocides, denaturants, drug astringents, external analgesics, film formers, opacifying agents, pH adjusters, propellants, reducing agents, sequestrants, skin conditioning agents, skin soothing agents, skin treating agents, vitamins, silicones, fatty alcohols and mixtures thereof.

7. A method of protecting skin from exposure to the sun, comprising:
   providing a suncare formulation of claim 1, and
   applying the suncare formulation to skin.

8. The suncare formulation of claim 1, wherein unfunctionalized cellulose polymer has a weight average molecular weight of 90,000 to 1,400,000 Daltons.

9. The suncare formulation of claim 1, wherein unfunctionalized cellulose polymer has a weight average molecular weight of 95,000 to 1,300,000 Daltons.

10. The suncare formulation of claim 1, wherein unfunctionalized cellulose polymer has a weight average molecular weight of 100,000 to 1,000,000 Daltons.

11. The suncare formulation of claim 6, wherein unfunctionalized cellulose polymer has a weight average molecular weight of 90,000 to 1,400,000 Daltons.

12. The suncare formulation of claim 6, wherein unfunctionalized cellulose polymer has a weight average molecular weight of 95,000 to 1,300,000 Daltons.

13. The suncare formulation of claim 6, wherein unfunctionalized cellulose polymer has a weight average molecular weight of 100,000 to 1,000,000 Daltons.

* * * * *